March 4, 1952  E. W. HOLMES  2,588,003
HYDRAULICALLY OPERATED RECIPROCATING SICKLE MECHANISM
Filed March 26, 1948  4 Sheets-Sheet 1
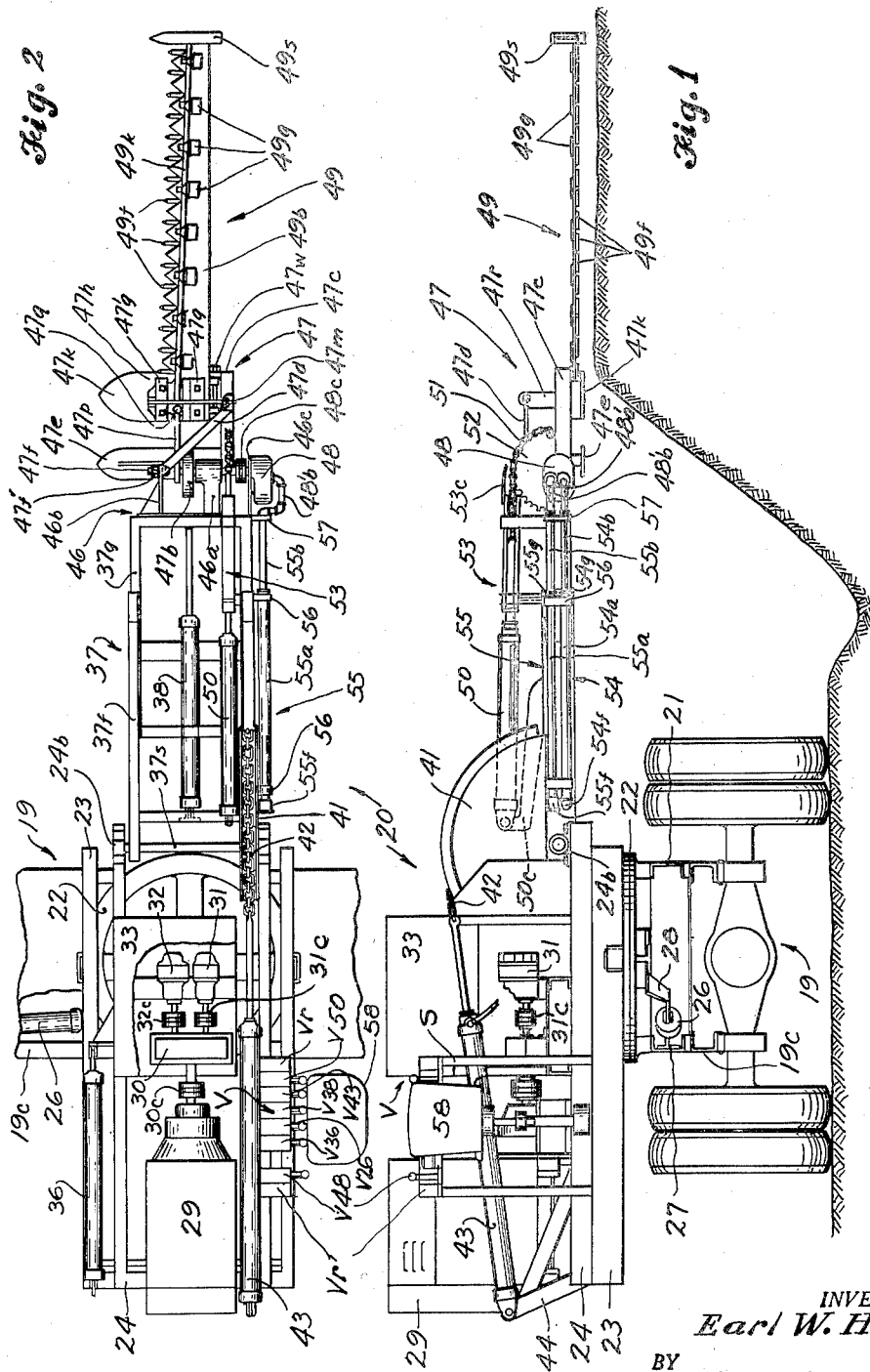
INVENTOR.
*Earl W. Holmes*
BY
*Fred C. Matheny*
ATTORNEY

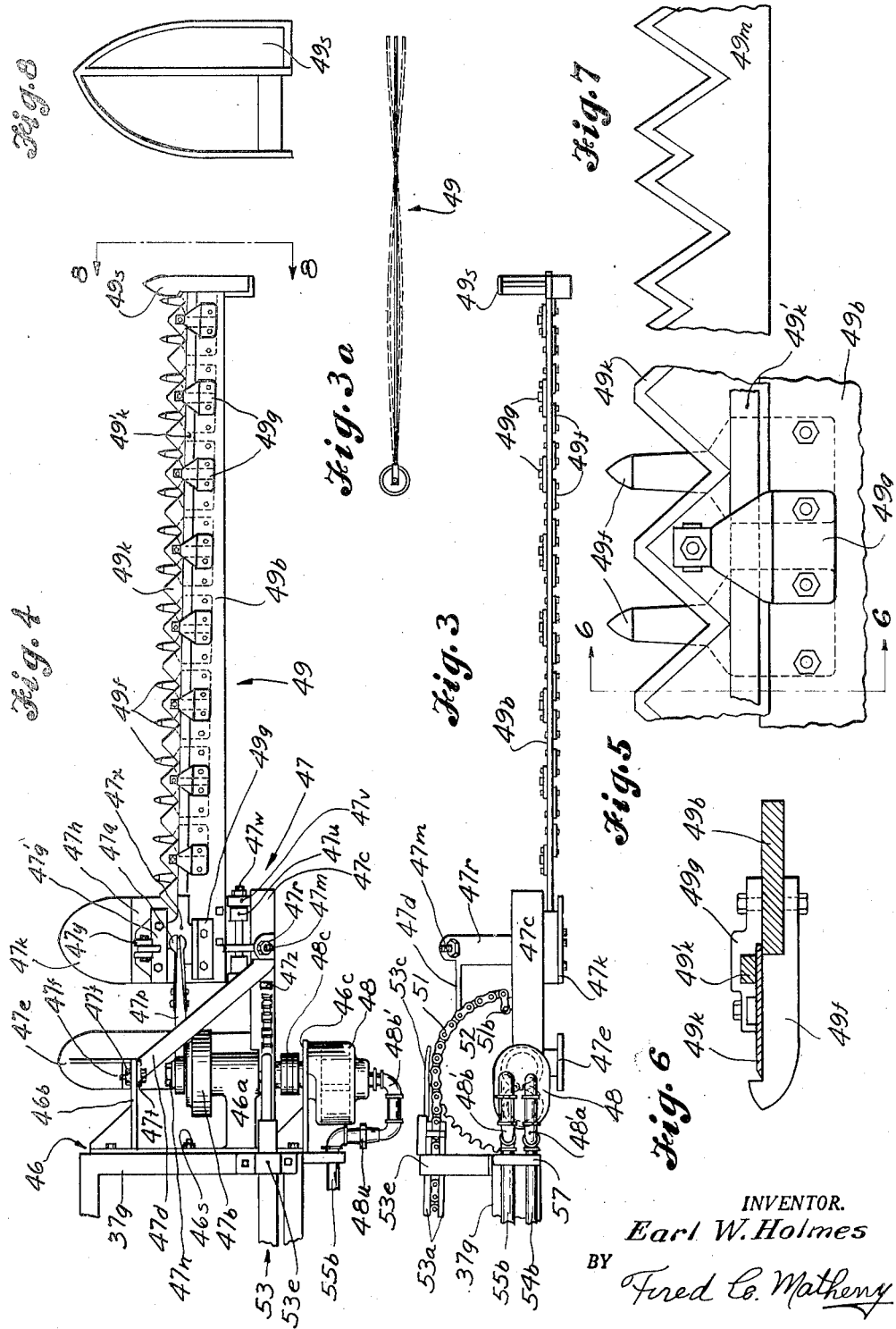

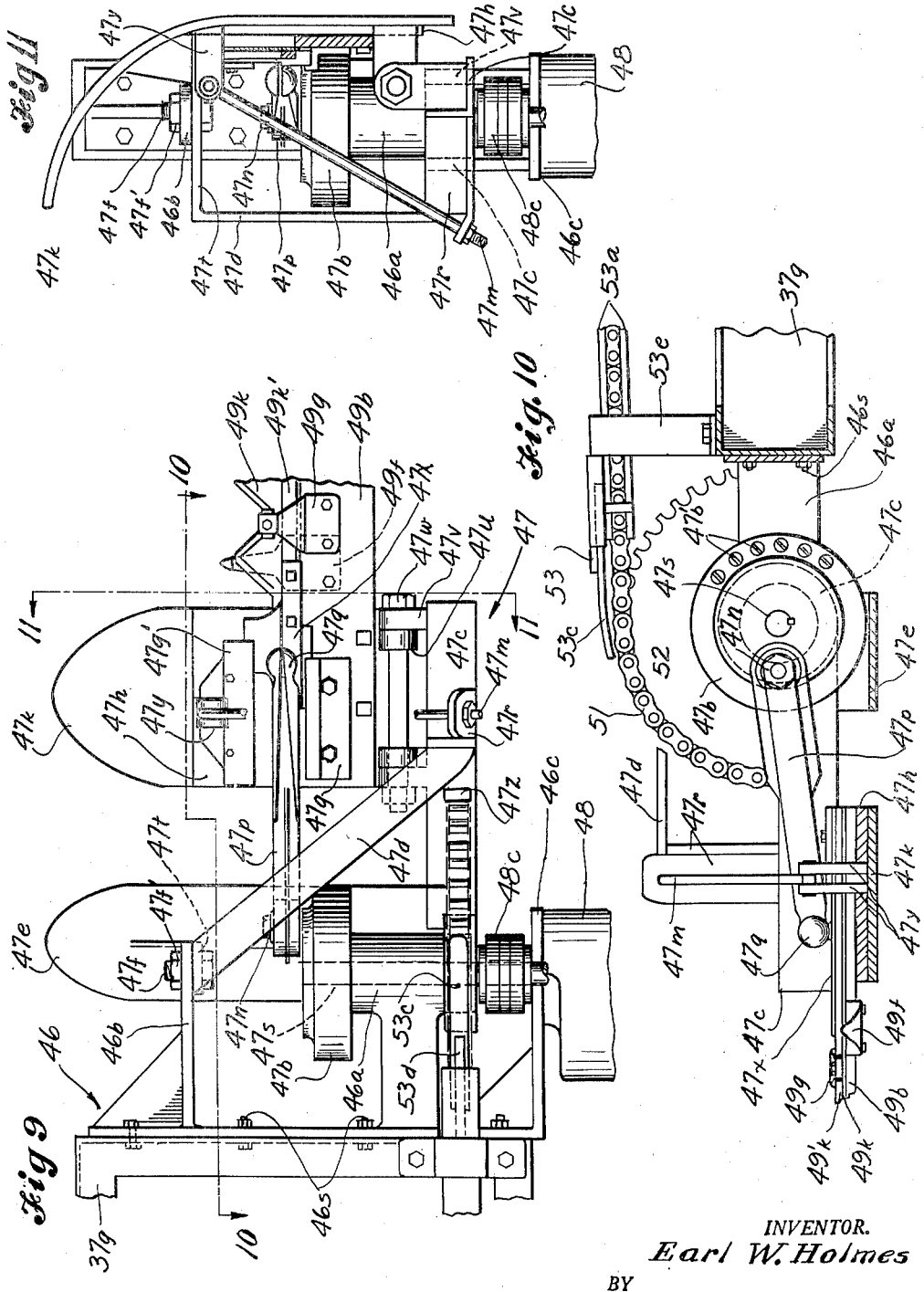

March 4, 1952 E. W. HOLMES 2,588,003
HYDRAULICALLY OPERATED RECIPROCATING SICKLE MECHANISM
Filed March 26, 1948 4 Sheets-Sheet 4
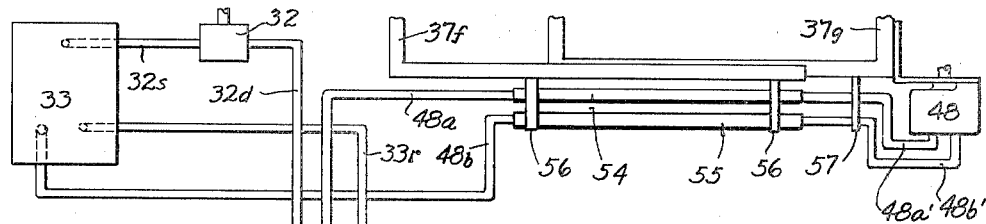
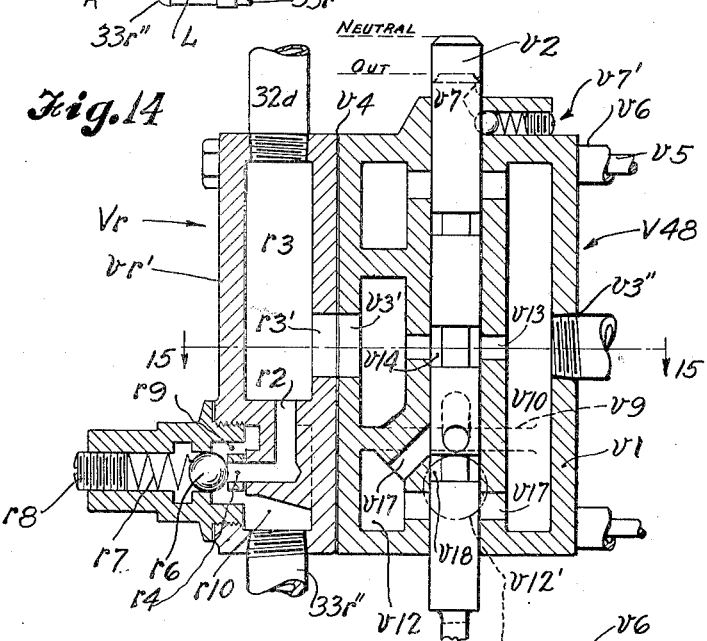
INVENTOR.
Earl W. Holmes
BY
Fred C. Matheny
ATTORNEY Patented Mar. 4, 1952

2,588,003

UNITED STATES PATENT OFFICE 2,588,003

HYDRAULICALLY OPERATED RECIPROCATING SICKLE MECHANISM

Earl W. Holmes, Burlington, Wash., assignor to Hall Machine and Iron Works, Inc., Mount Vernon, Wash.

Application March 26, 1948, Serial No. 17,345

9 Claims. (Cl. 56—25)

Numerous mechanical means have been employed in the past to drive mower sickles used for harvesting crops and for cutting weeds along the sides of highways and railroad rights of way. For the latter application the sickle may be supported at the end of an adjustable arm at a considerable distance from the driving shaft. Various combinations of mechanical elements, such as pulleys, belts, shafts, gearing, sprockets, chains, levers and linkage bars, have been devised to transmit the power from said remote shaft to the sickle operating mechanism used to reciprocate the sickle blade slidably mounted upon the sickle bar.

Such mechanical power transmission means require considerable operating and maintenance attention, and have been found to be inadequate and impractical for fast heavy-duty mobile service, especially where the sickle is required to cut rank growths of brush or to trim overhanging tree branches.

The present invention overcomes the deficiencies and limitations of such mechanical power transmission means by combining a small yet powerful hydraulic motor with the sickle operating mechanism, thereby providing a direct drive that greatly increases the cutting capacity and cutting rate of the sickle, and eliminates all moving mechanical elements as parts of said power transmission means, which often become entangled with the cut brush and branches. The associated hydraulic system supplies adequate power to said motor through two simple conduit runs, and provides fingertip control by means of a suitable combination of throttle valve and relief valve.

The invention is particularly characterized in the class described by:

An adjustable cutter sickle mechanism assembly that is adapted to be removably mounted as a unit at the end of a strong and rigid adjustable telescoping support frame that facilitates moving the cutter sickle to various positions for cutting way-side brush and overhanging tree boughs;

A cutter sickle mechanism that is directly driven by a hydraulic motor which may be remotely and manually controlled by suitable valve means;

Mechanism means that cause the cutter sickle to vibrate transversely of its length in order to facilitate its operation when cutting heavy growths of brush and overhanging tree branches;

A combination of parts which coact to control and transmit power hydraulically from a remote source of mechanical power to the driving mechanism used to reciprocate the blade of an adjustable cutter sickle; and Various other advantageous parts and combinations of parts that will be discerned by those skilled in the art.

The novel construction and combination of component parts that coact in a preferred form of the invention to achieve the aforesaid characterizing features of the invention, are described in the following specification, illustrated in the accompanying drawings and embraced in the appended claims.

In the drawings:

Figure 1 is an elevation of the weed and brush cutter disclosed in my aforesaid copending application as viewed from the rear of the truck with the cutter mechanism plant swung crosswise, and with the support frame and a preferred embodiment of the instant cutter sickle invention in their horizontal operating positions;

Fig. 2 is a plan view of the same with portions of the truck omitted;

Fig. 3 is a side elevation of said invention shown associated with the end of the support frame and with a portion of the position adjusting mechanism to a larger scale;

Fig. 3a is a diagram illustrating a type of transverse vibration that may be imparted to the cutter sickle by means of the invention for use in cutting heavy brush and overhanging tree branches.

Fig. 4 is a plan view of the mechanism of Fig. 3;

Fig. 5 is a plan view of a fragmentary portion of the sickle bar and reciprocating blade to a still larger scale;

Fig. 6 is a section taken on broken line 6—6 of Fig. 5;

Fig. 7 is a plan view of a fragmentary portion of another type of blade;

Fig. 8 is an end elevation of the combination skid and diverter shoe secured to the end of the sickle bar viewed as indicated by broken line 8—8 of Fig. 4, but to a larger scale;

Fig. 9 is a plan view of the sickle support and operating mechanism shown associated with certain other coacting elements to a larger scale than in Fig. 4;

Fig. 10 is a sectional elevation taken on broken line 10—10 of Fig. 9;

Fig. 11 is an end elevation of the same with section through the cutter sickle taken on broken line 11—11 of Fig. 9;

Fig. 12 is a diagram of the hydraulic motivating and control system;

Fig. 13 is a side elevation of a preferred control valve unit for the hydraulic motor together with the associated operating lever and structural support;

Fig. 14 is a longitudinal section through the control valve and associated relief valve units taken on broken line 14—14 of Fig. 13 to a larger scale; and Fig. 15 is a section taken on broken line 15—15 of Fig. 14, with the relief valve removed.

Like numerals and letters of reference indicate like parts throughout the several figures of the drawings.

Mechanism of mobile weed and brush cutter

In order to explain the advantages accruing through the adaptation of my invention, a brief description of my weed and brush cutter will suffice, since the particular type of such machine is incidental to the present invention which has a wide range of application in various kinds of power operated mowing machines, irrespective of the specific form of construction therein embodied.

Referring particularly to Figs. 1 and 2 of the drawings, the numeral 19 indicates an automotive truck as the mobile carrier for the cutter mechanism unit 20, the component members of which coact to expeditiously position and operate the cutter sickle while the truck is being driven forward. Said cutter mechanism unit preferably is assembled upon a foundation frame 21 so it may be removably secured to bed frame channels 19c of the truck.

A turntable 22 has its lower annular member secured to the aforesaid foundation frame and its upper member supports turntable frame 23, with which base frame 24 of the cutter mechanism plant is so associated by suitable rolling means (not shown) that it may be slidably adjusted lengthwise of said turntable frame by means of hydraulic actuator 36. This and each of the other such actuators shown, comprises a cylinder, piston, piston rod and stuffing gland, and is provided with means at the end of the cylinder and at the end of the piston rod for fastening to suitable coacting elements for the activation of the movable member with which it is associated. Activator 26, for example, coacts with bracket 27 and with lever 28 secured to the upper turntable member to swing the cutter mechanism plant as a whole to and from its operating position crosswise of the truck bed, as shown in Figs. 1 and 2.

Internal combustion engine unit 29 drives gear-type hydraulic pumps 31 and 32 through the intermediacy of twin speed reducing unit 30 and flexible couplings 30c, 31c and 32c, respectively, to supply the fluid under pressure required to operate and control the hydraulic activators and hydraulic sickle motor 48, respectively. Storage tank 33 supplies a system of conduits and valves, which connect with said activators. Said storage tank also supplies the system of conduits and valves used in connection with motor 48, as shown in the diagram of Fig. 12 and hereinafter explained.

Telescoping support frame 37 preferably consists of an outer frame 37f and an inner frame 37g associated therewith and slidable therein. Shaft 37s is a part of frame 37f and provides a swinging support at one end thereof by means of bearings 24b secured to an end of base frame 24. Hydraulic activator 38 and coacting bracket elements serve to position frame 37g relative to frame 37f as operating conditions may require.

Activator 43 and the mechanism elements associated therewith provide means for swinging the aforesaid support frame into various vertical angular positions relative to base frame 24. Said mechanism elements may consist of chain quadrant 41 fixedly secured to frame 37f, chain 42 and braced bracket 44 fixedly secured to said base frame.

The adjustable cutter sickle mechanism assembly, with which the present invention is primarily concerned, comprises a base member 46 secured to the end of frame 37g, a sickle support and driving mechanism 47 swingingly supported upon said base member, and cutter sickle 49.

The vertical angular movements of sickle 49 and associated mechanism 47 relative to telescoping support frame 37, may be accomplished by means of a mechanism combination comprising: Hydraulic activator 50 secured at one end to bracket 50c, which in turn is fixedly secured to frame 37g; heavy roller chain 51 attached at one end to the piston rod of said activator and at the other end to a half sprocket wheel 52, which is secured to element 47c of mechanism 47; and guide member 53, that also is secured to frame 37g, and which is adapted to serve as an alignment guide for said piston rod and attached chain, whereby the activator can transmit both push and pull forces to said half sprocket wheel. Aperture 47z may be provided in arm 47c as a passage way for said guide finger in order to increase the upward angular swing of the sickle support and driving mechanism. See Fig. 4.

Control valve units designated in Fig. 2 as V26, V36, V38, V43, and V50 are combined to form valve assembly V as a part of the aforesaid hydraulic system, and these enable an operator in seat 58 to control activators 26, 36, 38, 43 and 50 respectively.

The foregoing description refers to the principal mechanism members that coact to adjustably position and advance the cutter sickle through the growth of weeds, brush and overhanging tree branches, which must be cut by the sickle itself. The hydraulically operated vibrating sickle mechanism and related apparatus associated therewith that comprise the instant invention, now will be described.

Cutter sickle mechanism assembly

The cutter sickle assembly comprising base member 46, sickle support and driving mechanism 47, and sickle 49, as hereinbefore stated, is a separable operating entity, and preferably is removably secured as such to the end of telescoping support frame 37 and its coacting mechanism by means of stud bolts 46s, chain bolt 51b and unions in conduit runs 48a' and 48b'. See Figs. 3 and 4. This permits the assembly to be removed and replaced by another quickly in case of damage, or for the periodic inspection and maintenance of both the assembly and the strong and rigid telescoping support frame that facilitates moving the cutter sickle to various heavy-duty operating positions.

The base member provides a bearing 46a in which shaft 47s is journaled, and upon which the annular end of sickle support arm 47c is swingingly mounted coaxially with said shaft. Crank disk 47b may be fixedly secured upon a projecting end portion of said shaft, as shown in Figs. 9 and 10.

Arm 47c is provided with an upwardly disposed angle bracket 47r that is joined by diagonal brace 47d to an upwardly disposed braced bracket 47t from skid shoe 47e, the rear end of which is fixedly secured to said arm. Bolt 47f, threaded into bracket 46b of the base member and secured thereto by locknut 47f', may be used to pivotally support the forward end of the combined support arm and skid shoe coaxially with shaft 47s; it also holds the annular portion of arm 47c in place on bearing 46a.

Hydraulic motor 48 preferably is of the balanced gear type, and may be supported with its shaft in axial alignment with shaft 47s by means of bracket 46c of the base member. Flexible coupling 48c provides a direct drive connection between these axially aligned shafts. Valve unit V48 provides a remote control for the operation of said motor, as hereinafter explained.

Sickle bar 49b is secured to sickle head piece 47h by means of its own bolts and also by those of guide member 47g. Another guide member 47g' secured to said head piece slidably positions a cross head 47x, which is affixed to reciprocating sickle blade 49k. Apertured lugs 47u on said head piece articulate with similar lugs on support arm 47c and through which bolt 47w passes, thus providing a transverse pivotal support for the sickle head piece and associated elements. Another skid shoe 47k is secured to the bottom of said head piece. Bolt and nut 47m, diagonally positioned between upwardly disposed angle bracket 47r of arms 47c and lugs 47y of the head piece, provide means for adjusting the angular position of said head piece in relation to said support arm, and thereby for adjusting the transverse angular position of the sickle bar, upon which are mounted the reciprocating sickle blade, guides 49g therefor and fingers 49f, which cooperate with said blade to do the actual cutting.

Crank 47n of crank disk 47b drives the sickle blade by means of pitman 47p and the usual ball and socket connection 47q to cross head 47x. Considerable strength and lateral stability are imparted to the sickle blade by means of the attached blade bar 49k', which is held in slidable position by guides 49g and is secured to crosshead 47x, as shown best in Figs. 4, 5, 6 and 9. A combination skid and diverter shoe 49s is secured to the outer end of the sickle bar.

The form of sickle blade shown in detail in Figs. 4 and 5 is suitable for cutting heavy growths of rank weeds and light brush, but I have found that much better results may be obtained when cutting heavy brush and overhanging tree branches by using the form of sickle blade shown in Fig. 7. In that case the cutting action is more comparable with what is commonly known as sawing rather than cutting.

Vibrating cutter sickle

An important further improvement is achieved for such heavy-duty cutting by imparting lateral vibrations to the cutter sickle as a whole, as illustrated in Fig. 3a. The type of vibration therein indicated is for a sickle that is free to vibrate. The position of the nodes and antinodes, and also the amplitude of the vibrations, may change considerably under actual operating conditions.

A preferred simple means of imparting such vibrations to the cutter sickle may comprise a plurality of threaded plugs 47b' that are adapted to fit tightly into tapped apertures in crank disk 47b. It is desirable to have the arrangement such that when all of the plugs are in position, as shown in Fig. 10, the vibration will be negligible. This is the preferred adjustment when the apparatus is to be used for some time to cut only weeds and light brush. When heavy brush and tree limbs are to be cut a sufficient number of said plugs are removed to unbalance the crank disk enough to impart the amplitude of vibration in a free sickle that experience has demonstrated to be best for cutting the type of growth expected for the ensuing period of operation. Obviously, the mechanism may be made to vibrate the sickle also by adding one or more weights to the crank disk, preferably on the crank side of the crank disk, but I prefer the means illustrated because of its simplicity and reliability.

The vibrating sickle greatly expedites the heavy-duty cutting operations when using either type of sickle blade hereinbefore mentioned, especially when cutting brush, partly because the vibrations shake the cut portions clear of the sickle so they are not again cut thereby, and partly because the vibrations enable the sickle in effect to better saw its way through heavy branches. Any weed or brush portions that will pass between adjacent projecting fingers 49f of the sickle bar can be cut quickly by said vibrating sickle as the mobile carrier pushes it through the heaviest tangles of jungle-like growths.

Hydraulic system for sickle motor

The preferred motivating and control system for transmitting power hydraulically to sickle motor 48, from remotely located engine 29, is shown diagrammatically in Fig. 12. This diagram clearly indicates the several conduit runs required, but except for certain special portions they have been omitted from the other figures of the drawings for the sake of clarity. It will be understood that each conduit section between the parts connected thereby may consist of all necessary lengths of pipe, tubing and appropriate fittings required in a system of this kind, which regularly carries a suitable refined mineral oil under an operating pressure of approximately 1200 lb. per sq. in. for a motor speed of about 1000 R. P. M.

The aforesaid refined mineral oil should have a viscosity that is suitable for the weather conditions encountered. Such an oil having a viscosity of approximately 150 seconds at 100 deg. Fahr., as measured by a Saybolt universal viscosimeter, has found to give satisfactory results in this locality.

The hydraulic system for the sickle motor may be a separate operating entity with its own source of power, such as a gasoline engine not shown in the diagram, a geartype pump 32 of the required capacity, and a storage reservoir 33; or it may work in combination with the hydraulic system used for the motivation and control of the actuators hereinbefore mentioned, wherein a common gasoline engine 29 drives one separate pump 31 for said activators and another pump 32 for the sickle motor through the intermediacy of a twin reducing gear 30, as hereinbefore explained. See Fig. 2. In the latter case reservoir 33, like engine 29, may be common to both hydraulic systems. The drawings of this application are based upon such associated use of the two said systems.

Moving valve V48 to its neutral position stops sickle motor 48, but with pump 32 operating fluid may continue to flow from storage tank 33 through suction conduit 32s, comprising a combination of suitable pipe fittings and hose, into the suction side of pump 32; thence through pressure conduit 32d, comprising a suitable combination of fittings, tubing and a short length of hose near the pump, into pressure inlet and relief valve unit $Vr'$; from which it may flow through valve V48 into cross Vx and through return conduit 33r back into the top of tank 33, thereby reducing the power input to the pump to the minimum required to maintain circulation of the fluid.

This idling flow circuit is provided by the construction of the control valve and associated relief valve unit shown clearly in Figs. 14 and 15. Valve body casting $v1$ provides chambers $v3$, $v10$ and $v12$ by means of partitions $v8$ and $v9$. Ports $v13$ connect chambers $v3$ and $v10$, and ports $v17$ connect chambers $v3$ and $v12$ through a central bore for valve piston $v2$, which is provide with restrictions $v14$ and $v18$ for the control of fluid flow through said ports. Pressure fluid is supplied through conduit 32d to relief valve unit $Vr$, which may be clamped securely against gasket $v4$ to valve body $v1$ by means of through bolts and nuts $v5$ and spacer pipes $v6$.

Piston valve $v2$ may be held in either of two main operating position by means of depressions $v7$ used cooperatively with a ball, spring and plug assembly $v7'$. Lever L, assembled with the valve unit upon support bracket S, together with pivoted link L3 may be provided for the manual operation of said piston valve.

With the valve piston in its "neutral" position as shown in Fig. 14, it will be seen that fluid may flow from chamber $r3$ of the abutting relief valve unit through apertures $r3'$ and $v3'$ into chamber $v3$ of valve V48, thence through ports $v13$, around valve restriction $v14$ and into chamber $v10$, from which it flows through the nipple in tapped aperture $v3''$ into cross Vx and back to tank 33 through conduit 33r, as hereinbefore stated.

When it is desired to operate the aforesaid sickle motor, piston $v2$ of valve V48 is moved to its "out" position, whereupon ports $v17$ first are opened and then ports $v13$ are closed. This prevents the pressure fluid supplied by pump 32 from returning to tank 33, but permits it to flow from pressure chamber $v3$ through port $v17$, around valve restriction $v18$ and into chamber $v12$, thence through outlet opening $v12'$ and conduit run 48a and associated parts to sickle motor 48. The fluid discharge from said motor may be returned to tank 33 direct through conduit run 48b and its associated parts, as indicated in the diagram of Fig. 12. Obviously when the piston of said valve is returned to its "neutral" position port $v13$ is opened and port $v17$ is closed so the flow of pressure fluid again is diverted from the sickle motor back into tank 33 by way of conduit 33r.

By only moving piston valve $v2$ only partly "out" valve unit V48 may be operated manually as a throttle valve to secure any sickle motor speed from zero to maximum that may be required under various operating conditions to produce optimum cutting results with minimum wear and tear of the equipment.

In addition to this manual control of the sickle motor, relief valve R of unit $Vr'$ may be used to perform the special function of automatically regulating the rate of flow of the pressure fluid through said motor within reasonable limits, thus compensating for the variations in speed of engine 29 caused by changes in load due to the operation of the hydraulic activators or variations in the power requirements of the cutter sickle. This may be accomplished by so adjusting spring $r7$ by means of screw $r8$ that under normal operating conditions the pressure fluid of chamber $r3$ transmitted through ducts $r2$ and $r4$ forces ball valve $r10$ from its seat slightly so a portion of the fluid from pump 32 may flow through drilled apertures $r9$ into discharge duct $r10$, thence through return conduits $33r''$ and 33r back into the storage tank.

Then in case the engine speed and fluid pressure increase, the relief valve opens wider and permits a greater proportion of the fluid to return to tank 33; and conversely when the engine speed and fluid pressure decrease said valve closes somewhat, thereby allowing a smaller proportion of the fluid to return to said tank. In case the cutter sickle becomes stalled for any reason, which would stop the flow of fluid through motor 48, valve R should open sufficiently to permit the entire flow of pressure fluid from pump 32 to return to the storage tank.

*Telescoping tube assemblies*

In order to provide for the in and out adjustments of frame 37g with reference to frame 37f and yet carry the driving fluid to and from cutter sickle motor 48, telescoping tube assemblies 54 and 55 may be provided in conduit runs 48a and 48b, respectively. The frictional resistance to fluid flow of return conduit run 48b preferably is reduced by using tubing, piping and fittings between said motor and storage tank 33, and for that reason telescoping tube assembly 55 is made larger in diameter than its associate assembly 54, although similar in construction.

Assembly 54 may comprise an outer tube 54a having a stuffing gland 54g at one end and a suitable fitting 54f for connecting it in conduit run 48a at its opposite end, plus an inner tube 54b that is adapted to slide within said outer tube and stuffing gland, and which terminates at its outer end in a pipe fitting of conduit run 48a' to motor 48. Likewise, assembly 55 may comprise respectively a larger outer tube 55a, stuffing gland 55g, fitting 55f and inner tube 55b, which terminates at its forward end in a pipe fitting for conduit run 48b'. Support brackets 56 may removably secure said outer tubes to a side channel of frame 37f, and bracket 57 may removably secure the forward ends of the aforesaid inner tubes to the corresponding side channel of frame 37g. The tube sections 54a and 55a are secured by bracket means 56 to a side channel 37f of telescopic frame 37. The tube sections 54b and 55b are secured by bracket means 57 to part 37g of telescopic frame 37 and fit slidably and telescopically within the respective tube sections 54a and 55a. Thus the telescoping tube assemblies are extensible and contractible along with the frame 37.

It will be noted that engine 29, fluid storage tank 33, pump 32, relief valve unit $Vr'$, control valve unit V48, telescoping tube assemblies 54 and 55, cutter sickle drive motor 48, and conduit runs 32s, 32d, $33r''$, 48a, 48a', 48b' and 48b comprise a complete system, whose parts coact to control and transmit power hydraulically from the remotely located engine to the driving mechanism used to reciprocate the blade of the adjustable cutter sickle.

The preferred form of the invention herein disclosed has demonstrated outstanding and greatly improved ability as a cutting sickle element for heavy-duty mobile weed and brush cutters, but it will be understood that the drawings and description thereof are illustrative only and are not to be construed as restricting the invention to this one embodiment. Those skilled in the art will understand that various equivalent parts and changes in their arrangement may be substituted for the construction herein shown without departing from the spirit and scope of the invention defined by the appended claims.

The following is claimed as new and subject to protection by Letters Patent:

1. In a mobile weed and brush cutter, an adjustable support frame, a base member secured to an end portion of said support frame, a substantially horizontal shaft carried by said base member, a flexible coupling attached to said shaft, a hydraulic motor axially aligned with said shaft and directly connected by said flexible coupling with said shaft, and a cutter sickle assembly pivoted for vertical swinging movement about an axis coincident with the axis of said shaft, said cutter sickle assembly having a sickle driven from said shaft.

2. In a mobile weed and brush cutter, an adjustable support frame, a base member secured to an end portion of said support frame, a substantially horizontal shaft carried by said base member, a flexible coupling connected with the rear end of said shaft, a hydraulic motor axially aligned with said shaft and directly connected by said flexible coupling with said shaft, crank means carried by the forward end of said shaft, a cutter sickle assembly pivoted for vertical swinging movement about said shaft, said cutter sickle assembly including a reciprocable sickle, and a pitman connecting said crank means with said sickle.

3. In a mobile weed and brush cutter, a cutter sickle assembly having a reciprocable sickle, a driven crank disc carried by said cutter sickle assembly and having a crank member connected with said sickle for reciprocating the same, and weights removably connected with the peripheral portion of said crank disc, whereby the amplitude of vibration of said crank disc and the cutter sickle assembly connected therewith can be varied.

4. In a mobile weed and brush cutter, a frame, a substantially horizontal driven shaft carried by said frame, a sickle bar pivoted for vertical swinging movement about said shaft, a sickle reciprocably supported by said sickle bar, a crank disc secured to said shaft, a plurality of weights removably connected with the peripheral portion of said crank disc whereby said crank disc can be dynamically unbalanced to set up vibrations for transversely vibrating said sickle bar, a crank pin on said crank disc, and pitman means connecting said crank pin and said sickle.

5. In a mobile weed and brush cutter, an adjustable support frame, a base member removably secured to and end portion of said support frame, a substantially horizontal shaft carried by said base member, a cutter sickle assembly pivoted for vertical swinging movement about said shaft and having a sickle driven from said shaft, a hydraulic motor mounted on said base member and directly connected with said shaft, a quadrant attached to said cutter sickle assembly, a flexible member removably connected with said quadrant for pivotally moving said cutter sickle assembly, guide means supporting said flexible member and terminating in a guide plate which extends over said quadrant in close proximity thereto, said guide means and said guide plate providing transverse support for said flexible member whereby either a push or a pull may be exerted by said flexible member on said quadrant, power means connected with said flexible member for moving the same and hydraulic conduit means detachably connected with said hydraulic motor.

6. In a mobile weed and brush cutter, a support frame, a substantially horizontal driven shaft carried by said support frame, a cutter sickle assembly pivoted for vertical swinging movement about said shaft, a quadrant attached to said cutter sickle assembly and having an arcuate toothed peripheral portion concentric to said shaft, a link belt secured to said quadrant and operable on the arcuate toothed portion thereof, a push and pull member connected with said link belt, and guide means supporting said push and pull member and said link belt whereby either a push or a pull can be exerted through said link belt and terminating in a guide plate which extends over said toothed quadrant in close proximity to the teeth thereof, on said quadrant.

7. In a moblie weed and brush cutter, a longitudinally extensible and contractible support frame, a cutter sickle assembly removably and adjustably connected with the outer end portion of said support frame, a hydraulic motor carried by said cutter sickle assembly, fluid pressure supply means remote from said hydraulic motor, and telescopic tube conduit means carried by said longitudinally extensible and contractable support frame and connecting said fluid pressure supply means with said hydraulic motor.

8. In a mobile weed and brush cutter, a longitudinally extensible and contractable support frame mounted for vertical swinging movement, a substantially horizontal shaft carried by the outer end portion of said support frame, sickle bar means pivoted for vertical swinging movement on said shaft, a sickle reciprocably supported by said sickle bar means, sickle reciprocating means connecting said sickle with said shaft, a hydraulic motor carried by said support frame and directly connected with said shaft, hydraulic pump means remote from said hydraulic motor, and telescopic tube means carried by said longitudinally extensible and contractable support frame and connecting said hydraulic pump means and said motor.

9. In a device of the class described, the combination of a base frame, a support frame swingingly connected at one end with said base frame, cutter sickle operating and vibrating mechanism adjustably associated with the other end of said support frame and including a crank disc carrying adjustable weight means, a sickle bar, a cutter sickle carried by said sickle bar and driven by said mechanism, a hydraulic motor associated with said mechanism and delivering power thereto for operating and transversely vibrating said sickle bar and said cutter sickle, and hydraulic system means for motivating and controlling said motor.

EARL W. HOLMES.

REFERENCES CITED

The following references are of record in the file of this patent:

UNITED STATES PATENTS

| Number | Name | Date |
|---|---|---|
| 1,535,004 | White | Apr. 21, 1925 |
| 1,662,607 | Hildebrand | Mar. 13, 1928 |
| 1,953,394 | Clapper | Apr. 3, 1934 |
| 1,958,405 | Anthoney et al. | May 15, 1934 |
| 2,190,161 | Moyer | Feb. 13, 1940 |
| 2,324,563 | Custenborder | July 20, 1943 |